(12) United States Patent
Branda et al.

(10) Patent No.: US 7,644,141 B2
(45) Date of Patent: Jan. 5, 2010

(54) HIGH-AVAILABILITY IDENTIFICATION AND APPLICATION INSTALLATION

(75) Inventors: Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/388,010

(22) Filed: Mar. 23, 2006

(65) Prior Publication Data

US 2007/0226324 A1 Sep. 27, 2007

(51) Int. Cl.
*G06F 15/177* (2006.01)
(52) U.S. Cl. .................. 709/220; 709/223; 709/224; 707/1; 707/6
(58) Field of Classification Search .......... 709/205, 709/220, 223, 224; 717/174, 175, 176, 177, 717/178; 714/1, 6
See application file for complete search history.

(56) References Cited

U.S. PATENT DOCUMENTS

| | | | |
|---|---|---|---|
| 7,234,072 B2 * | 6/2007 | Esfahany | 714/1 |
| 2003/0159137 A1 * | 8/2003 | Drake et al. | 717/172 |
| 2004/0031030 A1 * | 2/2004 | Kidder et al. | 717/172 |
| 2005/0262076 A1 * | 11/2005 | Voskuil | 707/8 |
| 2006/0090097 A1 * | 4/2006 | Ngan et al. | 714/6 |
| 2006/0123409 A1 * | 6/2006 | Jordan et al. | 717/174 |

* cited by examiner

*Primary Examiner*—Ario Etienne
*Assistant Examiner*—Andrew Georgandellis
(74) *Attorney, Agent, or Firm*—Martin & Associates LLC; Bret J. Petersen

(57) ABSTRACT

An apparatus and method is described for identification of applications that benefit from HA features and assisting a system administrator in the installation of the applications in an application server with HA features configured properly for run-time operation. In preferred embodiments, an HA policy engine allows a system administrator to set up one or more general HA policies in a policy table. In a preferred embodiment, an HA run-time engine uses the policies in the policy table to configure new applications being installed in the application server. Other embodiments include an application inspection unit that introspects the byte code of the application as well as deployment descriptors to determine which features and APIs are being used that can take advantage of HA functions.

13 Claims, 5 Drawing Sheets

HIGH-AVAILABILITY IDENTIFICATION AND APPLICATION INSTALLATION

BACKGROUND OF THE INVENTION

1. Technical Field

This invention generally relates to application servers and more specifically relates to an apparatus and method for high availability identification and application installation in a computer application server.

2. Background Art

Computer systems typically include operating system software that controls the basic function of the computer, and one or more software application programs that run under the control of the operating system to perform desired tasks. As the capabilities of computer systems have increased, the application software programs designed for high performance computer systems have become extremely powerful. Computer systems often employ data and application servers that are connected over a network to provide data files and software application files to client machines. Additionally, software system maintenance costs have continued to rise because more powerful and complex programs and server environments take more time and expertise, and hence more money, to maintain.

Computer systems sometimes employ high availability (HA) technology to ensure data and resources of the computer system are always available. High-availability means availability despite planned outages for upgrades or unplanned outages caused by hardware or software failures. This technology achieves high data availability through fragmentation and replication of data across multiple servers. This technology typically relies on sending and receiving journal entries to maintain the data consistency of duplicate data across the servers.

The HA technology can be advantageously applied to an application server environment. An application server is a computer that is accessed over a network that holds software and data resources needed by one or more client computers. The client computers request data and application software from the application server when needed. HA technology in the application server will help ensure that the server resources are always available when needed by the client computers. Application servers that have HA capability in the prior art are very rigid, complex and difficult to configure. These systems typically require a system administrator with a complete knowledge of the HA technology to configure and install new applications onto the application server.

Without a simpler and more flexible way to configure and install HA functions in an application server, the computer industry will continue to suffer from the high cost and complexity of application server configuration and maintenance of HA functions.

BRIEF SUMMARY OF THE INVENTION

According to the preferred embodiments, an apparatus and method is described for identification of applications that benefit from HA features and assisting a system administrator in the installation of the applications in an application server with HA features configured properly for run-time operation. In preferred embodiments, an HA policy engine allows a system administrator to set up one or more general HA policies in a policy table. In a preferred embodiment, an HA run-time engine uses the policies in the policy table to configure new applications being installed in the application server. Other embodiments include an application inspection unit that introspects the byte code of the application as well as deployment descriptors to determine which features and APIs are being used that can take advantage of HA functions.

While the preferred embodiments described herein are directed to the WebSphere server environment, the claimed embodiments herein expressly include other web server environments with their associated architectures and files.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

DETAILED DESCRIPTION OF THE INVENTION

The present invention relates to application servers and in particular the WebSphere application server is used for the illustrated examples. For those who are not familiar with WebSphere and application servers, the brief overview below provides background information that will help the reader to understand the present invention.

1. Overview

WebSphere Application Server in the WebSphere Environment

WebSphere is the IBM brand of software products that are designed to work together to deliver dynamic e-business solutions for connecting people, systems, and applications with internal and external resources. The WebSphere environment of software products includes an application server. WebSphere is based on infrastructure software (middleware) designed for dynamic e-business. It delivers a secure, and reliable software portfolio. The technology that powers WebSphere products is Java™. Over the past several years, many software vendors have collaborated on a set of server-side application programming technologies that help build Web accessible, distributed, platform-neutral applications. These technologies are collectively branded as the Java 2 Platform, Enterprise Edition (J2EE). This contrasts with the Java 2 Standard Edition (J2SE) platform, with which most clients are familiar. J2SE supports the development of client-side applications with rich graphical user interfaces (GUIs). The J2EE platform is built on top of the J2SE platform. J2EE consists of application technologies for defining business logic and accessing enterprise resources such as databases, Enterprise Resource Planning (ERP) systems, messaging systems, e-mail servers, and so forth.

2. Detailed Description

According to a preferred embodiment of the present invention, an apparatus and method is described for identification of applications that benefit from HA features and assisting a system administrator in the installation of the applications in a WebSphere application server with HA features configured properly for run-time operation.

Figure 1:
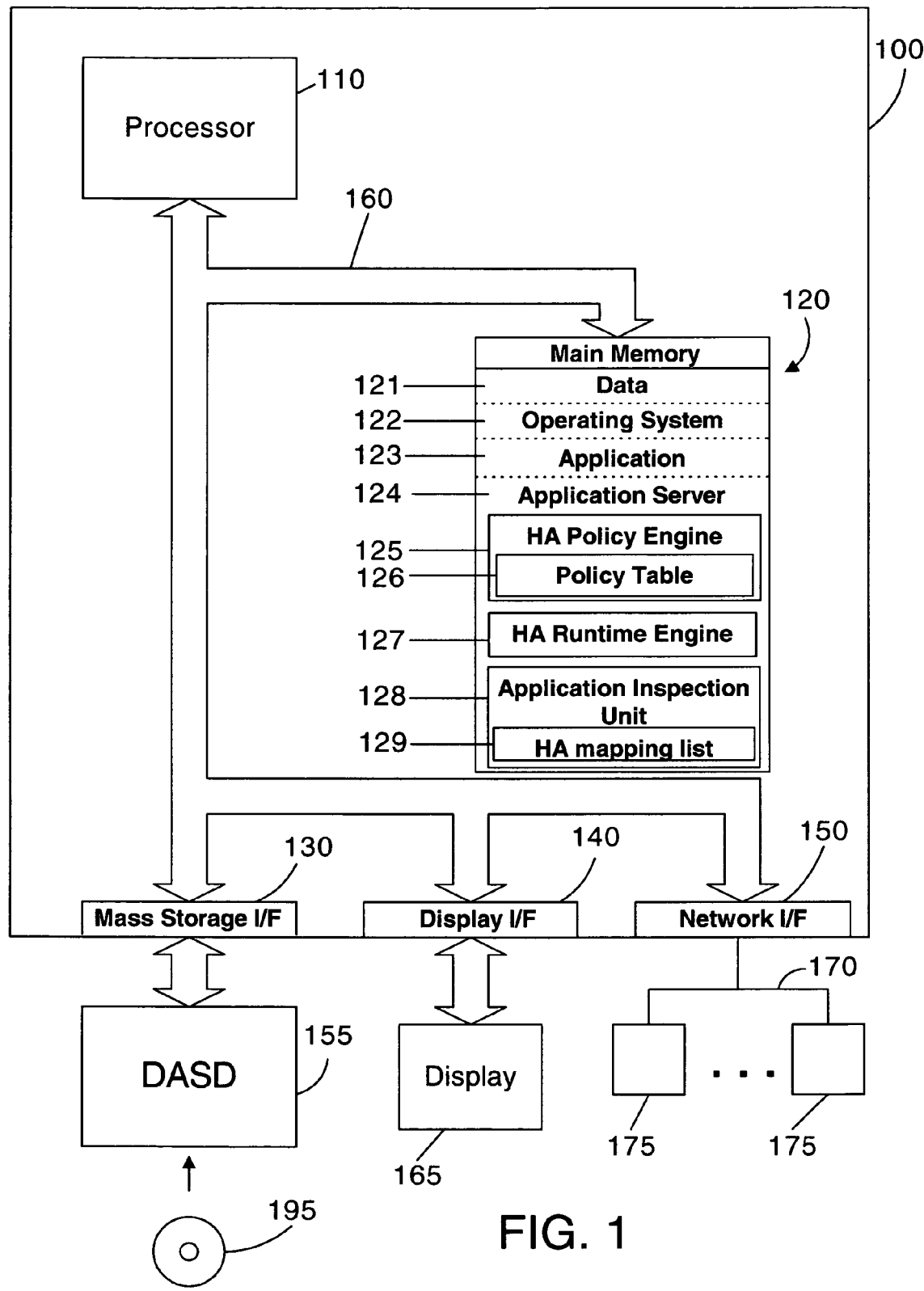
FIG. 1 is a block diagram of an apparatus in accordance with a preferred embodiment of the present invention.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, an application program 123, and an application server 124. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Application 123 is any application program that is supplied to a client computer (now shown) by the application server 124. In preferred embodiments, the application server 124 includes an HA policy engine 125 with a policy table 126, an HA runtime engine 127, and an application inspection unit 128 with an HA mapping list 129. These elements of preferred embodiments are described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, application 123, and the application server 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a computer readable medium in a variety of forms. Examples of suitable computer-readable media include floppy disks and CD RW (e.g., 195 of FIG. 1).

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

Figure 2:
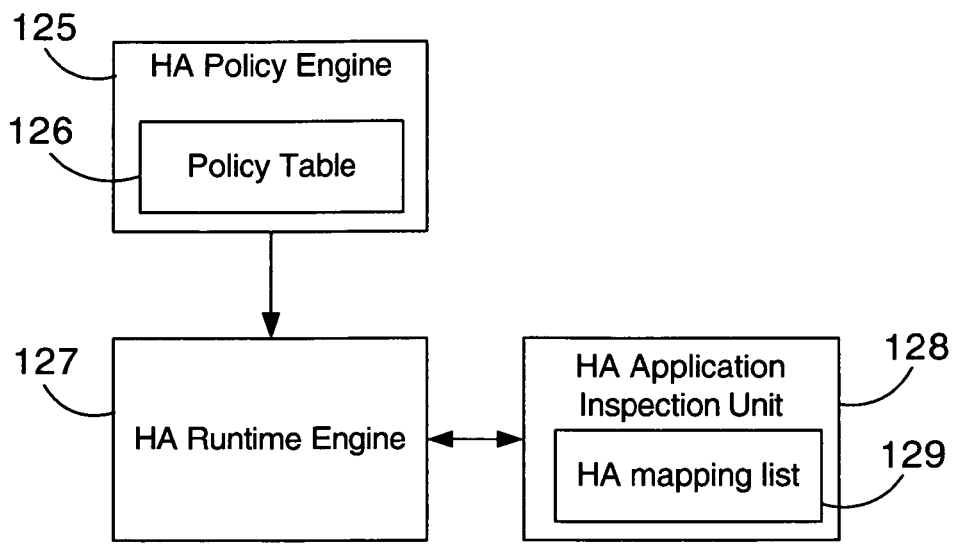
FIG. 2 is a block diagram that represents the HA policy engine with respect to the HA runtime engine and the HA application introspection unit.

Referring now to FIG. 2, the HA policy engine 125, the HA runtime engine 127 and the HA application inspection unit 128, which are part of the application server 124 introduced above with reference to FIG. 1, will be described in further detail. The HA policy engine 125 in preferred embodiments allows the system administrator to define and store a number of HA policies in a policy table 126. These stored HA policies form the basis for automatically setting HA policies for applications as they are installed by the HA runtime engine 127. An example of a predefined HA policy is "If HTTP sessions are detected, then enable time-based write session replication to database ABC." Other examples of predefined policies include those shown in FIG. 7 and described in the related example. In the preferred embodiments, the HA policy engine requests HA policies from a user (system administrator) and checks to make sure the policies are valid. If they are valid, the policies are added to the policy table 126 for future use. A policy is valid if the high availability feature needed for the policy is enabled or installed on the application server cluster.

Figure 7:
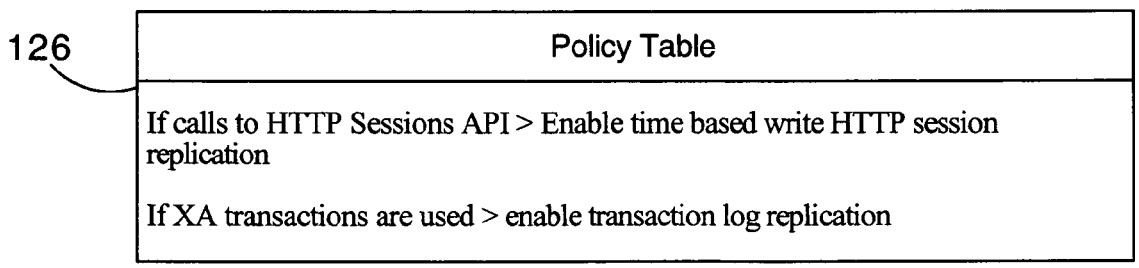
FIG. 7 is a sample policy table.

During operation of the application server, the HA runtime engine 127 will receive an application to be installed on the application server. The HA runtime engine 127 first determines if the application is correct. This simply means that the application is complete and has the necessary features to be used in the application server. If the application is correct, then the application is sent to the HA application inspection unit 128. The HA application inspection unit parses the application to determine what HA features can be used with this application. In the preferred embodiments, the HA application inspection unit checks for HA functionality on application program interface (API) boundaries and any metafiles of the application to determine what HA features can be used with this application. API boundaries are those places where applications exchange information using the well known API programming interface components. In this context, metafiles include XML like files containing configuration information about the application server. All potential HA features that are discovered are then stored in the HA mapping list 129. FIG. 7 shows some examples of features stored in the HA mapping list 129.

The HA runtime engine 127 continues to process the application after the application is parsed and the mapping list is created. If there are no potential HA features stored in the mapping list, then the application is installed in the normal manner without HA features. If there are potential HA features stored in the mapping list, then the application is installed and the HA features are configured based on the mapping list, the HA policy table, and administrator input. To configure the HA features means to set up and enable the desired level of HA function on the application server such as to provide the application with a highly available runtime as describe further below. In preferred embodiments, the extent of the administrator input requested by the HA runtime engine differs depending on a batch mode. The batch mode can be selected by administrator in the application server setup. The operation of the runtime engine and the use of the batch mode is described in more detail below.

To configure the application, the HA runtime engine compares the HA mapping list with the policy table. Where there is no HA policy that corresponds to the potential HA feature found in the mapping file, the application installer is prompted to supply the proper policy input for the HA features. If there is an HA policy that corresponds to the potential HA feature found in the mapping file and if the application server is set up in batch mode, the stored policies in the policy table 126 are applied directly by the HA runtime engine 127. Otherwise, the stored policies are confirmed with the administrator if the application server is not in batch mode. Thus, when there are HA policies available in the policy table 126, the runtime engine 127 can use these predefined policies without interaction from the administrator, or administrator can be informed of the predefined policy, and asked to affirm the use of the predefined policy. If there are no applicable HA policies available, then the administrator is requested to input an applicable HA policy.

Once the decisions of HA policy have been made, the HA runtime engine 127 sets up the runtime HA environment and ensures that it is correctly configured. To accomplish this, the HA runtime engine 127 installs the application and attempts to configure the HA features per the policies as described above. If there are problems with the configurations, the HA runtime engine 127 will try to make changes to the configuration for proper operation. If it is not possible to correct the configuration, then the HA runtime engine 127 warns the administrator that there is an incomplete HA setup that is being applied. In this way, the HA runtime engine 127 ensures a correct configuration of the HA components to maximize application reliability using the HA features of the application server.

Figure 3:
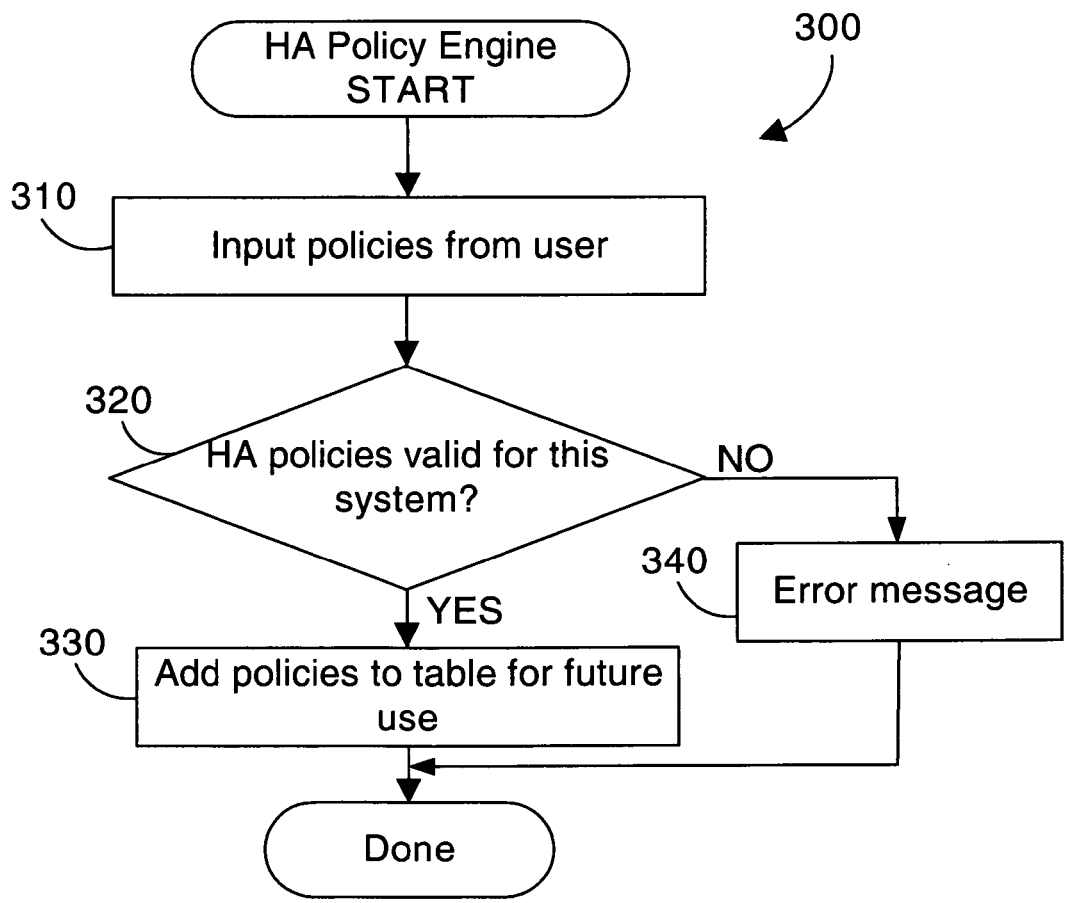
FIG. 3 is a flow diagram of a method for setting up policies to be used when installing new applications according to preferred embodiments.

Referring now to FIG. 3, a method 300 is shown according to preferred embodiments herein. Method 300 illustrates creating an HA policy table 126 according to preferred embodiments. The method receives input from the user (step 310). If the input from the user is not valid for the system (step 320=no), then an error message is displayed to the user (step 340) and the method is done. If the HA policy is valid for the system (step 320=yes), then the policy is stored in the policy table 126 (step 330) and the method is done.

Figure 4:
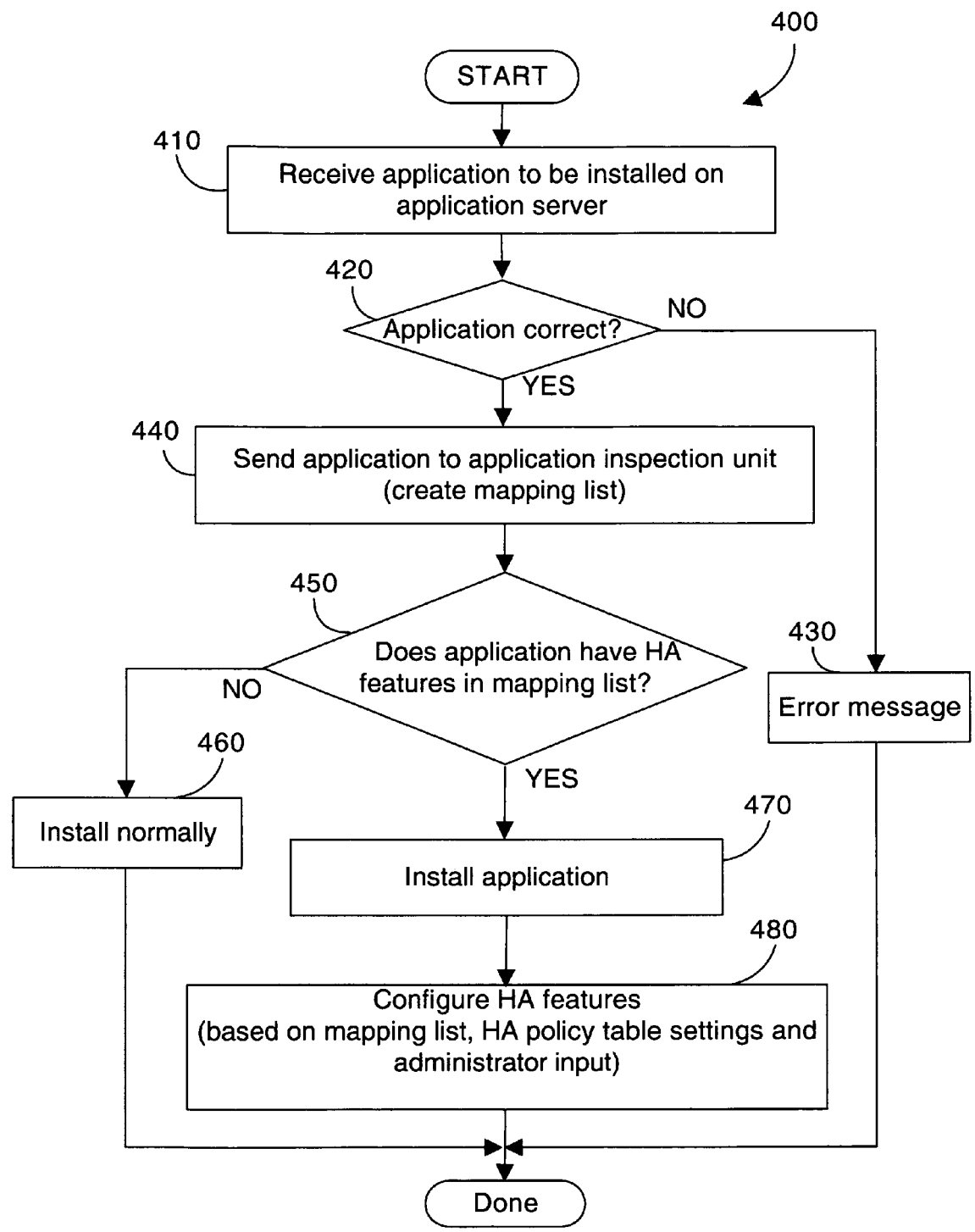
FIG. 4 is a flow diagram of a method for implementing the HA runtime engine according to preferred embodiments.

Referring now to FIG. 4, a method 400 is shown according to preferred embodiments herein. Method 400 illustrates a method for implementing the HA runtime engine according to preferred embodiments. The method receives as input an application to be installed on the application server 124 (step 410). If the application is not correct (step 420=no), then an error message is displayed to the user (step 430) and the method is done. If the application is correct (step 420=yes), then the application is sent to the application inspection unit 128 (step 440—see FIG. 6) to create a mapping list 129. If there are no HA features in the application's mapping list (step 450=no) then the application is installed normally (step 460) and the method is done. If there are HA features in the application's mapping list (step 450=yes) then the application is installed (step 470) and the application is configured to use HA features based on the mapping list, the HA policies in the policy table and administrator input (step 460—see FIG. 5) and the method is done.

Figure 5:
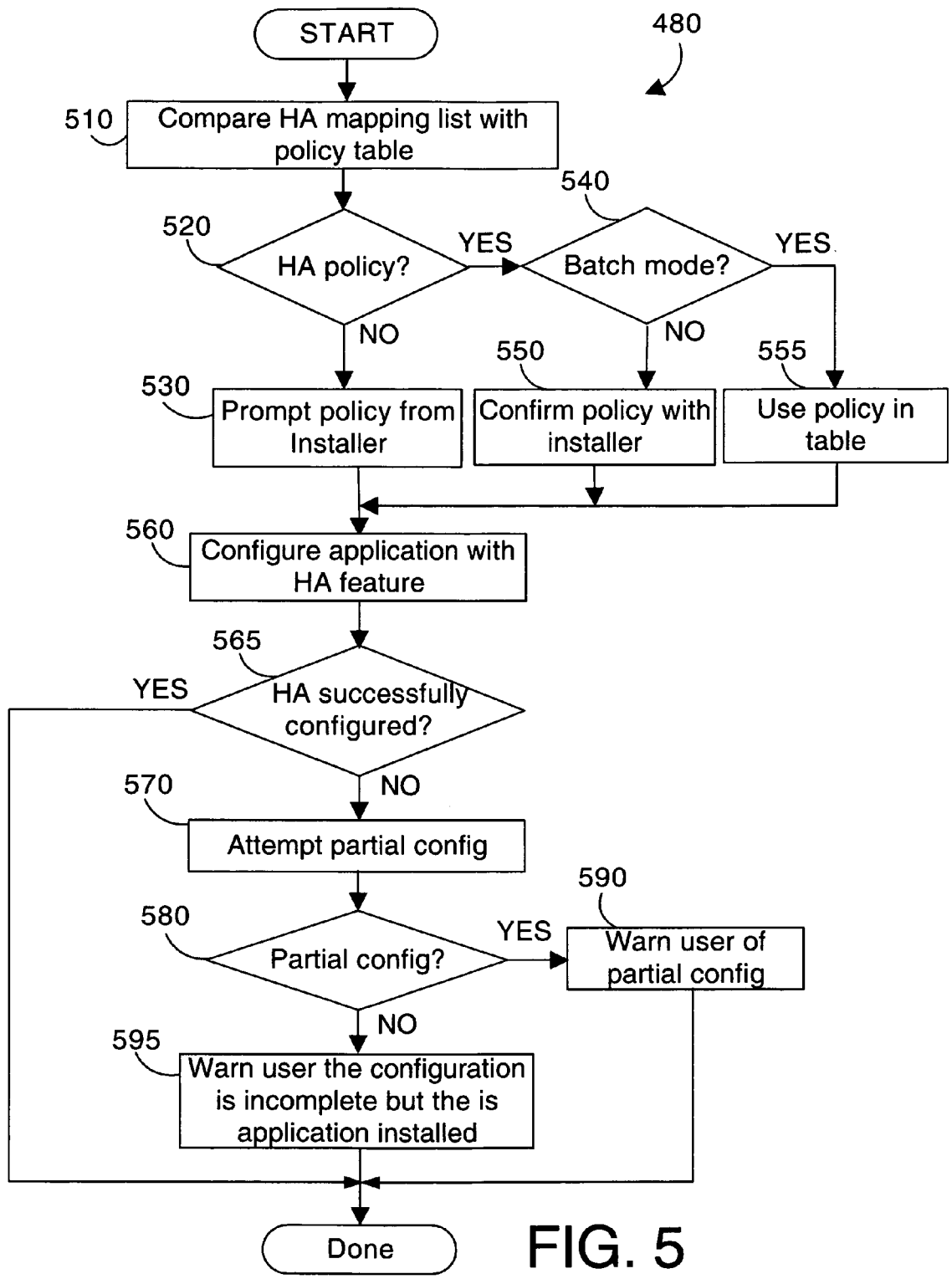
FIG. 5 is a flow diagram of a method for configuring HA features according to preferred embodiments.

Referring now to FIG. 5, a method 480 is shown as one suitable implementation for step 480 in FIG. 4 according to preferred embodiments herein. Method 480 configures an application to use HA features according to preferred embodiments. The method compares the HA mapping list 129 with the policies in the policy table 126 (step 510). If there is no HA policy that matches the mapping list (step 520=no), then the installer is prompted to supply the HA policy for the application (step 530). If there is an HA policy that matches the mapping list (step 520=yes), and if the application server is not set for batch mode (step 540=no) then the installer is prompted to confirm the HA policy for the application (step 550). If there is an HA policy that matches the mapping list (step 520=yes), and if the application server is set for batch mode (step 540=yes) then the HA policy in the policy table is used to configure the application (step 555). The application is then configured (step 560) with the appropriate HA feature according to the HA policy as just determined in the above step. If the application is successfully configured and the HA features for the application applied to the server system (step 565=yes) then the method is done. If the application is not successfully configured (step 565=no) then attempt a partial configuration (step 570). If the partial configuration is successful (step 580=yes) then warn the user of the partial configuration (step 590) and the method is then done. If the partial configuration is not successful (step 580=no) then warn the user the configuration is not complete but the application was installed (step 595) and the method is then done.

Figure 6:
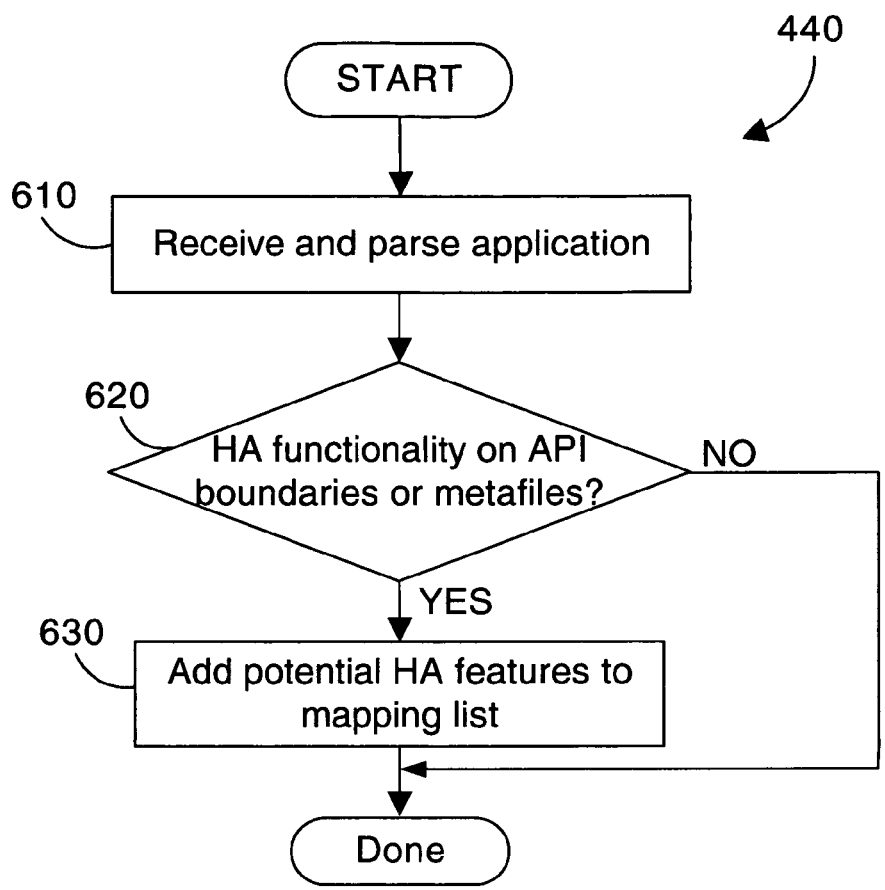
FIG. 6 is a flow diagram of a method for inspecting applications according to preferred embodiments.

Referring now to FIG. 6, a method 440 is shown as one suitable implementation for step 440 in FIG. 4 according to preferred embodiments herein. Method 440 illustrates the operation of inspecting the application for potential HA features and creating a mapping list 129 according to preferred embodiments. The method receives and parses an application to inspect from the HA runtime engine 127 (step 610). If the application does not have HA functionality on API boundaries or metafiles (step 620=no), then nothing is added to the mapping list and the method is done. If there is potential HA functionality (step 620=yes), then the HA functionality is stored in the HA mapping list 129 (step 630) and the method is done.

Figure 8:
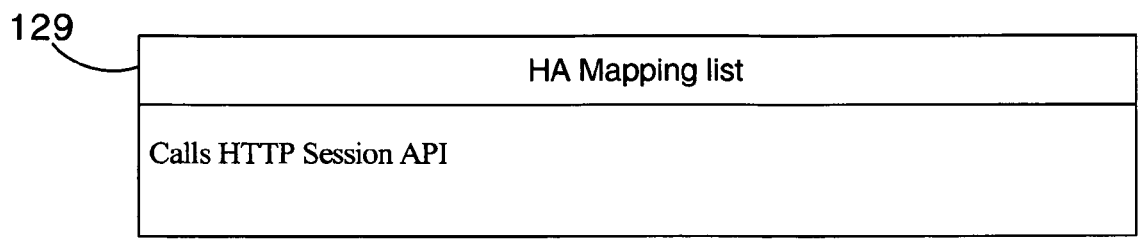
FIG. 8 is a sample mapping list.

An example according to preferred embodiments will now be described with reference to FIGS. 7 and 8. Using the HA policy engine (125 described above) a first user would create one or more policies that are placed in the policy table 126 shown in FIG. 7. In the example shown in FIG. 7, two policies have been created and placed in the policy table 126. In this example, the user has set a policy that if any programmatic calls to specific APIs, in this case calls to the HTTP Session API, are detected by the application inspection unit then the application server should take the specified action determined by business needs as set by the user with the policy engine. In this example, the specified action is to enable Time Based Write HTTP session replication because it fits the needs of the environment. The user also has specified to enable XA transaction log replication on remote machines if XA transactions are used. Thus the Policy table holds two entries as shown in FIG. 7.

Subsequently at some later time, a second user or administrator at the same company installs an application into the application server. Note that the second user or administrator does not necessarily need to have the extensive training in HA configuration since the earlier setup of the policy table will ease the installation by the second user. When the second user begins the installation of the application, the application is sent to the application inspection unit as described above. The application inspection unit detects the HTTP Session APIs and places this item in the mapping list 129 as shown in FIG. 8. The mapping list 129 after inspection of the application holds: Calls to HTTP Sessions API. So that comparing the mapping list with the policy tables finds a match between the mapping list 129 and the policy table 126. The runtime then configures Time Based Write HTTP Session replication as an HA feature on the server during the applications installation as described above with reference to FIG. 5.

An apparatus and method has been described for identification of applications that benefit from HA features and assisting a system administrator in the installation of the applications in an application server. The described embodiments provide a more flexible way to configure and install HA functions in an application server, to reduce the high cost and complexity of application server configuration and maintenance of HA functions in the prior art.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A computer apparatus comprising:
    at least one processor;
    a memory coupled to the at least one processor;
    an application server program in the memory comprising:
        a high availability (HA) policy engine that prompts a computer administrator to define and store a number of general HA policies in a policy table, where the HA policies are in the form of rules with conditions for automatically setting HA policies for a plurality of applications when an application of the plurality of applications is later installed;
        an application inspection unit that parses the application to be installed to determine if the one application can use HA features;
        an HA runtime engine that installs and configures the application for HA features based on the application's ability to use HA features and the HA policies in the policy table;
        wherein the application inspection unit parses the application to determine if the application can benefit from HA functionality on API boundaries and metafiles; and
        wherein the application inspection unit creates a mapping list of potential HA functionality that is compared to the policy table by the HA runtime engine.

2. The apparatus of claim 1 wherein the application server program further configures the application for HA features based on policies prompted from the user at installation.

3. The apparatus of claim 1 wherein the application server program attempts a partial configuration if the configuration of HA features is unsuccessful.

4. The apparatus of claim 1 wherein the application server program is part of WebSphere.

5. A computer method for installing an application in an application server, the method comprising the steps of:
    (A) receiving a number of general HA policies from a system administrator, where the HA policies are in the form of rules with conditions for automatically setting HA policies for a plurality of applications when an application of the plurality of applications is later installed;
    (B) checking the HA policies from the system administrator to determine if the HA policies are valid for the computer system;
    (C) adding valid HA policies to a policy table to be used when an application is to be installed in the application server;
    (D) receiving the application to be installed on the application server;
    (E) inspecting the application and creating a mapping list of potential HA features, comprising the steps of:
        (E1) parsing the application;
        (E2) locating HA functionality on API boundaries or in metafiles to determine what HA features can be used with the application; and
        (E3) adding the located potential HA features to the mapping list; and
    (F) installing the application and configuring the application with HA features based on the mapping list and HA policies in the policy table, comprising the steps of:
        (F1) comparing the HA mapping list with the policy table;
        (F2) prompting an installer if there is no HA policy in the policy table for a potential HA feature in the mapping list;

(F3) confirming an HA policy with the installer if a batch mode is not active; and (F4) using a policy in the policy table if the batch mode is active.

6. The method of claim 5 further comprising the steps of:

(G) attempting to configure the application with the HA feature according to the policy determined in steps F2, F3 and F4;

(H) where the configuration is unsuccessful, attempting to partially configure the application;

(I) warning the user if the partial configuration is successful; and (J) warning the user if the partial configuration is not successful.

7. A computer readable medium storing an application server program, said application server program comprising computer-readable instructions that cause a computer to perform the following steps when the instructions are executed by the computer:

an HA policy engine that prompts a computer administrator to define and store a number of general HA policies in a policy table that are used when an application is later installed, where the HA policies are in the form of rules with conditions for automatically setting HA policies for a plurality of applications;

an HA runtime engine that installs and configures the application for HA features based on the application's ability to use HA features and the HA policies in the policy table;

an application inspection unit that parses the application to determine if the application can benefit from HA functionality on API boundaries and metafiles;

wherein the application inspection unit creates a mapping list of potential HA functionality that is compared to the policy table by the HA runtime engine.

8. The program product of claim 7 wherein the application sewer program further configures applications for HA features based on policies prompted from the user at installation.

9. The program product of claim 7 wherein the application server program attempts a partial configuration if the configuration of HA features is unsuccessful.

10. The program product of claim 7 wherein the application server program is part of WebSphere.

11. The apparatus of claim 1 wherein the HA policies are the form "if condition, then configure setting".

12. The method of claim 5 wherein the HA policies are in the form "if condition, then configure setting".

13. The program product of claim 7 wherein the HA policies are in the form "if condition, then configure setting".

\* \* \* \* \*